(12) United States Patent
Onishi et al.

(10) Patent No.: US 6,593,031 B1
(45) Date of Patent: Jul. 15, 2003

(54) NICKEL METAL-HYDRIDE CELL

(75) Inventors: Masuhiro Onishi, Suita (JP); Hiroshi Fukunaga, Suita (JP); Masato Isogai, Mito (JP); Ryo Nagai, Hirakata (JP)

(73) Assignee: Hitachi Maxell, Ltd., Ibaraki (JP)

( * ) Notice: Subject to any disclaimer, the term of this patent is extended or adjusted under 35 U.S.C. 154(b) by 85 days.

(21) Appl. No.: 09/635,804

(22) Filed: Aug. 11, 2000

(30) Foreign Application Priority Data

Aug. 13, 1999 (JP) ............................................. 11-229521
Feb. 22, 2000 (JP) ........................................ 2000-050497

(51) Int. Cl.⁷ .............................. H01M 4/58; C01B 6/24
(52) U.S. Cl. ................. 429/218.2; 429/223; 252/182.1; 420/900
(58) Field of Search ............................. 429/218.2, 223, 429/224, 231.3, 218.1; 252/182.1; 420/900

(56) References Cited

U.S. PATENT DOCUMENTS

| | | | | |
|---|---|---|---|---|
| 4,935,318 A | * | 6/1990 | Ikoma et al. | 429/206 |
| 5,032,475 A | * | 7/1991 | Hasebe et al. | 429/60 |
| 5,506,076 A | * | 4/1996 | Miyamoto et al. | 429/223 |
| 5,584,892 A | * | 12/1996 | Lim | 29/623.5 |

FOREIGN PATENT DOCUMENTS

| | | |
|---|---|---|
| EP | 0142878 | 5/1985 |
| JP | 1162741 | 6/1989 |
| JP | 515774 | 3/1993 |
| JP | 586029 | 12/1993 |
| JP | A737607 | 2/1995 |

* cited by examiner

*Primary Examiner*—Stephen Kalafut
*Assistant Examiner*—Raymond Alejandro
(74) *Attorney, Agent, or Firm*—Birch, Stewart, Kolasch & Birch, LLP

(57) ABSTRACT

A nickel metal-hydride cell having a paste type nickel positive electrode containing nickel hydroxide and a cobalt conducting aid selected from the group consisting of metal cobalt and cobalt compounds, a negative electrode which comprises a hydrogen absorbing alloy having a composition of the formula: $MmNi_{5-x+y}M_x$ in which Mm is a rare earth element, M is a metal element, $0<x<2$, and $-0.2<y<0.6$, a separator interposed between two electrodes, and an alkaline electrolytic solution, where a ratio of C—H to C—Co(II) is 1.3 or less, wherein C—H is a quantity of electricity of a discharge reserve formed in the negative electrode, and C—Co(II) is a quantity of electricity necessary for reducing cobalt oxide in the positive electrode to cobalt(II) oxide.

4 Claims, 2 Drawing Sheets

NICKEL METAL-HYDRIDE CELL

BACKGROUND OF THE INVENTION

1. Field of the Invention

The present invention relates to a nickel metal-hydride cell. In particular, the present invention relates to a nickel metal-hydride cell having improved storage properties at a high temperature.

2. Prior Art

With the progress of the miniaturization of portable electronic equipment, safer secondary cells having larger capacities are desired. Thus, various investigations have been made to further increase the capacities of nickel metal-hydride cells comprising a hydrogen absorbing alloy as a negative electrode active material. As a hydrogen absorbing alloy used as the negative electrode active material, Laves alloys ($AB_2$ type alloys) comprising Zr, Ni, V and Mn, Mg—Ni alloys ($A_2B$ type alloys) comprising Mg and Ni, and also rare earth metal alloys ($AB_5$ type alloys) comprising a rare earth element and Ni are well known. Among them, misch metal (Mm) alloys ($MmNi_5$) comprising a misch metal as a rare earth element is widely used as an electrode material since it can be easily activated and has a high ability to absorb and desorb hydrogen.

It is suitable for the hydrogen absorbing alloys to have a hydrogen equilibrium pressure of 20 to 500 kPa at room temperature judging from the charge-discharge efficiency, in addition to the high hydrogen absorbing capacity. However, the hydrogen equilibrium pressure of the $MmNi_5$ type alloys is as high as 1 MPa at room temperature, and therefore it should be lowered. Furthermore, the $MmNi_5$ type alloys have problems that the alloys are finely pulverized and suffer from the change of the composition and therefore the hydrogen absorbing ability and the reactivity tend to decrease, when they are repeatedly charged and discharged in an alkaline electrolytic solution.

Thus, $MmNi_5$ type alloys in which a part of Ni is replaced with other metal such as Mn attract attention, since they have a low hydrogen equilibrium dissociation pressure and good hydrogen absorbing abilities, and the life of the alloys can be extended in the charge-discharge reaction. Such misch metal alloys are disclosed in JP-B-5-15774, JP-B-5-86029, JP-A-1-162741, etc., and are characterized in that they have the substantially stoichiometric composition containing a relatively large amount of cobalt to prevent the pulverization and to improve the corrosion resistance against the electrolytic solution. In addition to such alloys having the stoichiometric composition, those having a non-stoichiometric composition containing the increased amount of elements on the B site (Ni site) are proposed.

With the miniaturization of the portable electronic equipment which uses a cell as a primary powder source, the occasions to carry and use the cells increase, and the cells are used in a wider variety of circumstances than ever. Thus, it is required for cells to exert the steady performances without being influenced by the change of environment, in particular, the change of temperature. For example, when a cell is used in a lap top type personal computer or a cellular phone, it is required to exhibit the same performances at low or high temperature as those at room temperature. Therefore, the requirements for the cells become severer. Accordingly, in the case of cells used in such electronic equipment, the further improvement of temperature characteristics is being studied.

However, a nickel metal-hydride cell, which comprises the above misch metal type alloy as a hydrogen absorbing alloy used as a negative electrode active material and a paste type nickel electrode as a non-sintered type positive electrode, suffers from the severe decrease of the cell voltage, when it is maintained at a high temperature atmosphere of 80° C. In particular, a multi-element type misch metal alloy, in which a part of Ni elements of $MmNi_5$ are replaced with at least Mn, suffers from the significant decrease of the voltage under the high temperature atmosphere.

Since the decrease of the voltage during the storage in a high temperature atmosphere will have large influences on the cell capacity after storage, it is very important to improve the high temperature storage properties of the nickel metal-hydride cells.

SUMMARY OF THE INVENTION

One object of the present invention is to provide a nickel metal-hydride cell comprising a rare earth metal based hydrogen absorbing alloy as a negative electrode active material and a paste type nickel electrode as a non-sintered type positive electrode, which has improved storage properties at high temperature, that is, which suffers from less decrease of the voltage during the storage in a high temperature atmosphere and has a large recovery rate of a capacity after the storage in a high temperature atmosphere.

To achieve the above object, the present inventors studied the decrease of the voltage of a nickel metal-hydride cell after the storage in a high temperature atmosphere, when the cell comprises a non-sintered type positive electrode consisting of a paste type nickel electrode to which cobalt or a cobalt compound is added as a conducting aid, and a negative electrode comprising a $MmNi_5$ type hydrogen absorbing alloy containing Mn. Thus, it was found that, as shown as Curve 1b in FIG. 2 (the results obtained in Comparative Example 1), the voltage decreased by two steps. As a result of the investigation into the causes of the voltage decrease, it was found that the first step decrease of the voltage down to about 0.9 V was due to the reduction of the positive electrode with hydrogen which was desorbed from the hydrogen absorbing alloy as the temperature rose, while the second step decrease of the voltage down to 0 V was due to the micro-short circuits formed in the cell.

Furthermore, it was found that the first step decrease of the voltage was caused as follows:

As the ambient temperature rises during the storage, the equilibrium dissociation pressure of the hydrogen absorbing alloy increases, and thus hydrogen, which is absorbed in the negative electrode as a discharge reserve and may not be essentially desorbed, is desorbed in the cell in the form of a hydrogen gas and then reduces the positive electrode. As a result, the storage properties at high temperature deteriorate. The reason for this phenomenon may be thought as follows:

The positive electrodes of the nickel metal-hydride cells include a sintered type positive electrode and a non-sintered positive electrode which is a paste type nickel electrode. The non-sintered type positive electrode may be produced by dispersing nickel hydroxide, a binder, a thickening agent, etc. in water or a solvent to form a paste, and filling the paste in a conductive porous material which functions as a collector. In this case, a distance between the active material and a substrate increases and thus the utilization ratio of the active material tends to decrease. To increase the utilization ratio to achieve the high capacity, a cobalt conducting aid such as metal cobalt, cobalt monoxide, cobalt hydroxide, etc. is added to the positive electrode. Such cobalt conducting aids form cobalt oxide, for example, CoOOH which has a higher valency than the divalent in the course of charging, and thus a conductive network of cobalt oxide oxide which electrically connects the particles of nickel hydroxide is formed.

In the nickel metal-hydride cell, the generation of gasses from the negative electrode in the final period of charging or discharging is suppressed by making the capacity of the negative electrode larger than that of the positive electrode so that the oxygen gas generated from the positive electrode can be absorbed with the negative electrode. Thus, the tight sealing of the cell is achieved. That is, even after the positive electrode is fully charged in the course of charging, or completely discharged, the negative electrode still has a non-charged or non-discharged part, which allows the positive electrode to preferentially generate oxygen gas. Therefore, the generation of the gasses from the negative electrode is suppressed. The excessive capacity of the negative electrode in the period of discharge, that is, the quantity of electricity of the discharge reserve of the negative electrode does not directly contribute to the charge-discharge reactions, but it is necessary to discharge the positive electrode capacity to the end of the discharge. Therefore, the excessive capacity is formed in the negative electrode as a counter reaction to the above-described reaction to form the conductive network of cobalt oxide in the positive electrode.

However, when such nickel metal-hydride cells are stored in a high temperature atmosphere after discharging, an amount of hydrogen, which is stored as an excessive capacity of the negative electrode on the discharge side, that is, the quantity of electricity of the discharge reserve, is desorbed from the negative electrode as the temperature rises. Then, the desorbed hydrogen gas reduces the conductive network of cobalt oxide in the positive electrode, and thus decreases the voltage of the cells.

The above phenomenon was studied. As a result, it was found that, in the paste type nickel electrode, the discharge reserve contains a quantity of electricity which exceeds an amount corresponding to the counter reaction against the oxidation reaction of the cobalt conducting aid for maintaining the conductivity of the positive electrode, and the excessive amount is further increased by that corresponding to the corrosion reaction of the hydrogen absorbing alloy which acts as the negative electrode active material.

The misch metal alloy in which a part of Ni elements are replaced with other metal can decrease the hydrogen equilibrium dissociation pressure, improve the hydrogen absorbing ability and prolongs the life of the alloy in the charge-discharge reactions. However, since such a misch metal alloy containing a replacing metal has a more active surface than the MmNi$_5$ type alloy containing no replacing metal, the excessive quantity of electricity corresponding to the corrosion reaction of the alloy in the electrolytic solution is large, and therefore the hydrogen amount in the discharge reserve tends to increase. As a result, the voltage of the cells remarkably decreases during the storage in a high temperature atmosphere. In particular, when the misch metal alloy contains Mn as one of the alloy metals, Mn tends to be dissolved in the form of Mn ions in the electrolytic solution during the storage. Thus, the quantity of electricity corresponding to the counter reaction against the oxidation of Mn is stored as a part of the discharge reserve and thus the quantity of electricity of the discharge reserve further increases. When the Mn ions migrate to the positive electrode, they are oxidized at the positive electrode so that the conductive network of cobalt oxide is further reduced, since the electric potential of the positive electrode is higher than that of Mn ions.

Next, the second step decrease of the voltage may be caused as follows:

When the conductive network of cobalt oxide, which electrically connects the particles of nickel hydroxide, is formed, the cobalt ions formed by the dissolution are deposited on a separator which is in contact with the nickel electrode as the positive electrode, and thus the cobalt ions are oxidized to form cobalt oxide in the first charging cycle. However, at this time, the cobalt oxide is not deposited on a separator which is in contact with the hydrogen absorbing alloy electrode as the negative electrode. Therefore, no short-circuits are formed.

However, since the cells are often stored in a high temperature atmosphere after the finish of discharging, the positive electrode is reduced with the hydrogen gas desorbed from the hydrogen absorbing alloy in the first step as the temperature rises, and thus cobalt oxide with the higher oxidation state in the positive electrode may be reduced to cobalt oxide with the lower oxidation state which is soluble in the alkaline electrolytic solution. Therefore, cobalt ions are formed by the dissolution of cobalt oxide. The cobalt ions gradually migrate to the negative electrode and reduced to form metal cobalt. As a result, metal cobalt is deposited on the negative electrode during the storage of the cells at high temperature, and the deposited metal cobalt forms micro-short circuits with cobalt oxide which is deposited on the separator from the positive electrode. Thus, the voltage of the cells is decreased. That is, it is assumed that the second step decrease of the voltage is caused in correlation with the first step decrease of the voltage.

Then, based on the above findings, the present inventors have made further study to solve the above problems, and have completed the present invention.

Accordingly, the present invention provides a nickel metal-hydride cell comprising:

a paste type nickel positive electrode containing nickel hydroxide and a cobalt conducting aid selected from the group consisting of metal cobalt and cobalt compounds, a negative electrode which comprises a hydrogen absorbing alloy having a composition of the formula:

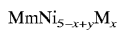

$$MmNi_{5-x+y}M_x$$

wherein Mm is a rare earth element containing at least La, M is a metal element containing at least Mn, x is a number larger than 0 and smaller than 2 (0<x<2), and y is a number larger than −0.2 and smaller than 0.6 (−0.2<y<0.6), a separator interposed between the positive and negative electrodes, and an electrolytic solution comprising an aqueous alkaline solution, in which a ratio of C—H to C—Co(II) is 1.3 or less (C—H/C—Co(II)≦1.3), wherein C—H is a quantity of electricity of a discharge reserve formed in the negative electrode, and C—Co(II) is a quantity of electricity necessary for reducing cobalt oxide with a higher oxidation state in the positive electrode to cobalt(II) oxide.

Herein, the quantity of electricity necessary for reducing cobalt oxide in the positive electrode to cobalt(II) oxide (C—Co(II)) means a quantity of electricity which remains after the discharge of nickel hydroxide, as can be understood from the above explanation. However, since the reducing rate of cobalt is very low and no discharge occurs under usual discharging conditions, the above quantity of electricity C—Co(II) means a quantity of electricity when the cell after discharging is further discharged at a microcurrent to 0 (zero) V.

Herein, the quantity of electricity of the discharge reserve formed in the negative electrode (C—H) is obtained by measuring the hydrogen gas contained in the negative electrode of the cell after discharging by a water-replacing method and converting the hydrogen volume to a mole amount.

DETAILED DESCRIPTION OF THE INVENTION

Figure 1:
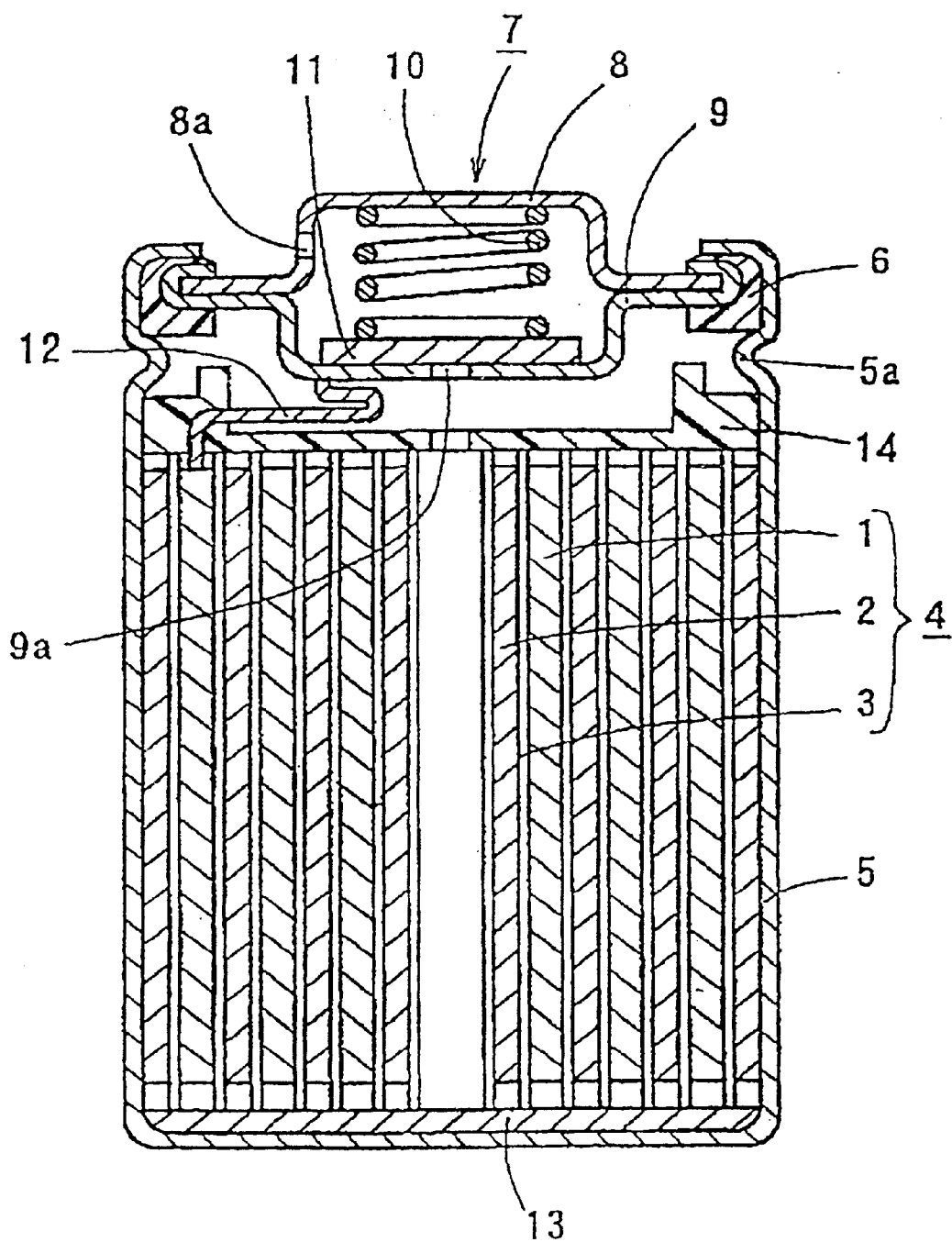
FIG. 1 is a schematic cross section of a nickel metal-hydride cell produced in the Examples.

Nickel hydroxide used in the positive electrode according to the present invention may be any conventional powdery nickel hydroxide. In particular, nickel hydroxide powder containing 0.5 to 5.0 wt. % of solid solution cobalt in the crystal of nickel hydroxide is preferably used, since it can increase the charging efficiency at high temperature. Furthermore, nickel hydroxide powder containing 0.5 to 5.0 wt. % of solid solution zinc is also preferably used, since it can improve the cycle life of the cell. Preferably, such nickel cobalt powder may be coated with at least one divalent or higher valent cobalt compound selected from the group consisting of cobalt monoxide, α-cobalt hydroxide, β-cobalt hydroxide and cobalt oxyhydroxide.

When the surfaces of the nickel hydroxide particles are coated with the above cobalt compound, the conductive network can be effectively formed with the smaller amount of cobalt than the addition of a cobalt conducting aid to uncoated nickel hydroxide. Among the cobalt compounds used to coat the cobalt hydroxide powder, α-cobalt hydroxide and β-cobalt hydroxide are most preferable since they can form the strong conductive network.

The coating cobalt compound may be complexed with Zn, Ca, Y, Yb, Mg, Ti, Zr, etc.

The amount of the cobalt compound coated on the nickel hydroxide is usually from 1 to 10 parts by weight, preferably from 2 to 5 parts by weight per 100 parts by weight of nickel hydroxide.

As the cobalt conducting aid contained in the positive electrode, metal cobalt or a cobalt compound such as cobalt monoxide, α-cobalt hydroxide, β-cobalt hydroxide, etc. can be used. Among them the cobalt compound, in particular, cobalt monoxide is preferable to decrease the quantity of electricity of the discharge reserve of the negative electrode and to form the strong cobalt oxide conductive network which can suppress the desorption of the hydrogen gas from the negative electrode.

Metal cobalt requires the three electron reactions of Co →Co(OH)$_2$→CoOOH. Accordingly, the quantity of electricity of the discharge reserve increases. When metal cobalt is used, it is preferably subjected to an alkali-dipping treatment, which will be explained below.

The amount of the cobalt conducting aid added to the positive electrode is usually from 0.5 to 10 parts by weight, preferably from 1 to 10 parts by weight per 100 parts by weight of nickel hydroxide to maintain the above properties and the high capacity.

The positive electrode of the present invention is a non-sintered paste type nickel electrode, which may be prepared by mixing the nickel hydroxide powder, the cobalt conducting aid, a binder (e.g. polytetrafluoroethylene (PTE), etc.) and a thickening agent (e.g. carboxymethyl cellulose (CMC), etc.) in an organic solvent to obtain a positive electrode paste, applying the paste on a porous metal substrate (e.g. foamed nickel, etc.), drying the applied paste, and pressing the dried paste on the substrate in a sheet form. In this process, the pressed paste may be oxidized by the alkali-dipping treatment or precharging to decrease the reduced amount of cobalt oxide in the positive electrode.

In the above alkali-dipping treatment, the cobalt conducting aid or the cobalt compound which coats the surfaces of the nickel hydroxide particles is converted to a slightly oxidized state, and thus the discharge reserve caused by the oxidation reaction of cobalt with the lower oxidation state is effectively decreased. To this end, in the alkali-dipping treatment, the temperature is usually from 35° C. to 100° C., preferably from 50° C. to 90° C., and the dipping time is usually from 0.2 hour to 1.2 hours, preferably from 0.25 hour to 0.8 hour.

For the same reasons as described above, the precharging is carried out for 1 to 100 hours, preferably 2 to 50 hours at an electric current of 0.001 C to 0.1 C (A), preferably 0.005 C to 0.5 C (A), in which "C" is a capacity (Ah) of the positive electrode, which is produced as described above.

As a hydrogen absorbing alloy constituting the negative electrode according to the present invention, a rare earth metal alloy having a composition of the formula:

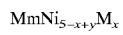

$$MmNi_{5-x+y}M_x$$

wherein Mm is a rare earth element containing at least La, M is a metal element containing at least Mn, x is a number larger than 0 and smaller than 2 (0<x<2), and y is a number larger than −0.2 and smaller than 0.6 (−0.2<y<0.6) is used.

The rare earth metal alloy containing Mn as a replacing metal has advantages that it can decrease the hydrogen equilibrium dissociation pressure of the alloy, and its capacity can be increased. However, since Mn has a lesser standard reduction potential, the corrosion reaction becomes dominant, and furthermore such a reaction finely pulverizes the alloy to increase the surface area so that the corrosion reaction tends to be accelerated. However, when the above rare earth metal alloy is used in accordance with the present invention, these drawbacks are overcome, while the above advantages can be utilized.

Examples of metals other than Mn include Co, Al, Cu, Mg, Cr, Zn, Sn, Fe, etc. Among the alloys, those containing at least Co and Al are preferable. Among the alloys having the above compositions, those having a non-stoichiometric composition containing the increased amount of the metals other than Mm (the metals of the B site), for example, hydrogen absorbing alloys in which a ratio of the total number of atoms of the other metals including Ni, Co, Mn and Al to the number of the Mm atoms is from 5.02 to 5.45, usually suffer from the deterioration of the high temperature-storage properties for the same reason as above, since the transition metal is often present on the alloy surfaces so that the amount of the desorbed hydrogen atom is large. However, such alloys are preferably used in the present invention, since the characteristics of such alloys can be effectively exerted.

The hydrogen absorbing alloys used according to the present invention may contain a very small amount of Si, Mo, Sb, Nb, Ti, etc.

It is preferable for the negative electrode of the present invention to contain a metal oxide to adjust the C—H/C—Co (II) ratio. Even when the hydrogen gas is generated by the corrosion reaction of the hydrogen absorbing alloy, the generated hydrogen can be used in a reaction to reduce the metal oxide to the metal before the generated hydrogen forms the discharge reserve, and thus the increase of the quantity of electricity of the discharge reserve can be prevented.

The metal oxide is preferably a metal oxide which can be reduced to a metal in the charging step and maintain the metal state in the usual operation potential range, in particular, a metal oxide with a divalent or higher oxidation state which requires a large amount of hydrogen in the reaction to reduce the metal oxide to the metal. Preferred examples of such oxides include α- or β-Co $(OH)_2$, $Co_2O_3$, $Co_3O_4$, NiO, $Ni_2O_3$, CuO, $Cu_2O$, $LiMO_2$ in which M is at least one metal selected from the group consisting of Co and Ni, etc. Among them, $Co_3O_4$, NiO and $LiMO_2$ are more preferable since they have less influences on the side reactions of the hydrogen absorbing alloy.

The amount of the metal oxide to be added depends on the kinds and the oxidation state of the metal oxide, and is usually from 0.5 to 5 parts by weight per 100 parts by weight of the hydrogen absorbing alloy.

The negative electrode to be used according to the present invention may be produced by mixing the hydrogen absorbing alloy and optionally the metal oxide together with a suitable binder and a conducting aid in water or an organic solvent to obtain a negative electrode paste, applying the paste on a conductive substrate, drying the applied paste, and pressing the dried paste on the substrate in a sheet form. In this process, the pressed paste may be oxidized by the alkali-dipping treatment like in the case of the positive electrode to suppress the corrosion reaction of the hydrogen absorbing alloy. This treatment can form an oxide on the surface of the hydrogen absorbing alloy, and the formed oxide is reduced to the metal and thus contributes to the decrease of the quantity of electricity of the discharge reserve.

The conditions for the above alkali-dipping treatment include a temperature of 50 to 100° C., preferably 60 to 90° C. and a dipping time of 0.2 to 2 hours, preferably 0.5 to 1 hour.

The nickel metal-hydride cell of the present invention comprising the above-described positive and negative electrodes, and a separator and an electrolytic solution comprising an aqueous alkaline solution, which are interposed between the electrodes. The cell of the present invention may be produced by spirally winding the positive and negative electrodes with interposing the separator between them, inserting the wound electrodes in a cell can, and pouring the electrolytic solution in the can. In this process, the positive and negative electrodes are assembled in the untransformed state, that is, they are assembled before they are not electrochemically charged or discharged in order to form the conductive network of cobalt oxide added to the positive electrode in the first charging step. When the positive and negative electrodes, which have not been charged or discharged, are assembled, metal cobalt or the cobalt compound contained in the positive electrode is oxidized to the cobalt oxide with the higher oxidation state by the aging or the first charging (transformation) after the assembly of the cell, while the quantity of electricity of the discharge reserve is formed in the negative electrode with the progress of the oxidation reaction. Thus, the cell with the positive electrode control can be obtained.

The nickel metal-hydride cell of the present invention is characterized in that the ratio of C—H to C—Co (II) is 1.3 or less, preferably 1.1 or less, more preferably 1.0 or less, in which C—H is the quantity of electricity of the discharge reserve formed in the negative electrode, and C—Co(II) is the quantity of electricity necessary for reducing cobalt oxide with a higher oxidation state in the positive electrode to cobalt(II) oxide after the transformation. When the above ratio is 1.3 or less, the quantity of electricity of the discharge reserve can be optimized in relation to the reaction to form the conductive network of cobalt oxide in the positive electrode, and further the desorption of the hydrogen gas from the negative electrode can be suppressed even during the storage in a high temperature atmosphere, so that the reduction of cobalt oxide in the positive electrode is decreased and the lowering of the cell voltage is prevented. In particular, when the above ratio is 1.0 or less, in the case of the desorption of the hydrogen gas from the negative electrode in the storage in a high temperature atmosphere, the lowering of the voltage can be avoided because of the low reducing ability to reduce the conductive network of cobalt oxide in the positive electrode, even if the micro-short circuits are formed in the above second step decrease of the voltage.

The quantity of electricity of the discharge reserve formed in the negative electrode is irreversibly formed by the oxidization of cobalt in the positive electrode, and may be increased by the decomposing reaction of the organic materials such as the binder or the corrosion reaction of the alloy in the paste type positive electrode. Therefore, if the discharge reserve of the cell is not controlled, the above ratio is usually 1.5 or larger. In a preferable embodiment of the present invention, the above ratio is 1.3 or less, in particular, 1.0 or less at which the quantity of electricity of the discharge reserve is equal to or less than the quantity of electricity necessary to reduce cobalt. However, the above ratio cannot be made too small because of the necessity to prevent the deterioration of the negative electrode in the case of overdischarge, and the discharging properties at low temperature are improved as the above ratio increases. Thus, the lower limit of the above ratio may be about 0.5.

The electrolytic solution contained in the cell can preferably contains a zinc compound. When the electrolytic solution contains the zinc compound, at least a part of the zinc compound forms zinc ions. The zinc ions migrate in the cell in the course of the charge and discharge reactions and suppress the migration of the Mn ions dissolved from the hydrogen absorbing alloy in the electrolytic solution towards the positive electrode, and further the formation of manganese oxide on the surface of the positive electrode active material. These effects can synergistically improve the discharging properties of the cell after the storage in a high temperature atmosphere.

The concentration of the zinc compound in the electrolytic solution is preferably from 30 to 65 g/L, more preferably from 40 to 55 g/L, in terms of zinc oxide.

The separator used in the cell of the present invention is preferably a non-woven fabric or a woven fabric and preferably comprises fusion bonding fibers. The structure of the fibers may core-sheath type composite fibers, side-by-side type composite fibers, single-component fibers, etc. Among them, the core-sheath type composite fibers are preferable from the viewpoint of strength. Among the fibers, fibers the surface of which is made hydrophilic by sulfonation and the like are preferable, since they have high penetration properties of the electrolytic solution. In the case of the separator made of the hydrophilic fibers, the cobalt ions, which are eluted from the positive electrode in the electrolytic solution, can easily pass through the separator. The cell of the present invention can cope with such passing of the cobalt ions through the separator. Therefore, the separator made of the hydrophilic fibers can be used without any problems.

The separator used in the cell of the present invention preferably contains at least one species selected from the group consisting of yttrium species, ytterbium species and erbium species.

As described above, the second step decrease of the voltage during the storage in a high temperature atmosphere is due to the reduction of the conductive network of cobalt oxide in the positive electrode with the hydrogen gas desorbed from the negative electrode in the first step decrease of the voltage. When the ratio of the quantity of electricity of the discharge reserve formed in the negative electrode to the quantity of electricity necessary for reducing cobalt oxide in the positive electrode is in the above defined range, the amount of the cobalt ions which are eluted from the positive electrode and deposited on the negative electrode during the storage in a high temperature atmosphere can be decreased, and thus the number of the short circuits formed between the cobalt oxide deposits on the separator and metal cobalt in the negative electrode can be decreased.

In this case, it is preferable to suppress the deposition of the cobalt oxide on the separator in contact with the positive electrode when the conductive network of cobalt oxide is formed. From this point of view, it is effective to support at least one of the yttrium species, the ytterbium species and the species on the separator. Herein, the yttrium, ytterbium or erbium species includes yttrium, ytterbium or erbium element as such or its oxide or complex. These species may be used singly or in admixture of two or more.

The use of the above element species is particularly advantageous to avoid the formation of the micro-short circuits between the cobalt oxide deposits on the separator and the metal oxide such as cobalt oxide in the negative electrode, when the metal oxide is added to the negative electrode to decrease the amount of the discharge reserve.

Since the above element species have very low solubility in the alkaline solution in comparison with cobalt, and the oxide of cobalt is formed on the separator, the effects of the element species decrease, when they are added to the electrolytic solution. In addition, once the element species are added to the separator, they seldom move from the separator. Thus, the addition of the above element species to the separator is most effective not to influence the cell elements other than the separator, in particular, the positive electrode, and to suppress the deposition of cobalt oxide on the separator when the conductive network of cobalt oxide is formed.

As described above, the above element species may be used as the element as such or in the form of an oxide or a complex. Among them, the oxide is preferable, since the addition of the oxide to the separator is easy.

The element species can be added to the separator by spraying the element species directly on the separator, dipping the separator in the aqueous dispersion of the element species and drying the separator, or applying the aqueous solution of the element species on the separator and drying the separator. Thus, the element species can be supported on the fibers constituting the separator.

The amount of the element species per the unit surface area of the separator is preferably from 0.05 to 3 mg/cm$^2$, more preferably from 0.1 to 2 mg/cm$^2$ in terms of the oxide of each element ($A_2O_3$ in which A is Y, Yb or Er). When the amount of the element species is in the above range, the deposition of cobalt oxide on the separator can be adequately prevented.

The present invention will be illustrated by the following Examples, which do not limit the present invention in any way.

In the Examples, "parts" are by weight.

EXAMPLE 1

To 100 parts of a nickel hydroxide powder coated with 4.7 wt. % of β-cobalt hydroxide (solid solution cobalt: 1.2 wt. %; solid solution zinc: 2 wt. %), 2.9 parts of cobalt monoxide as a cobalt conducting aid, 10 parts of a 2 wt % aqueous solution of carboxymethyl cellulose and 2 parts of a 60 wt. % dispersion of polytetrafluoroethylene were added and mixed to obtain a positive electrode paste.

The positive electrode paste was filled in and supported on a metal porous substrate made of a foamed nickel, dried and press molded in the form of a sheet. The sheet was dipped in a 30 wt. % aqueous solution of potassium hydroxide at 70° C. for 0.5 hour, dried, washed with water and redried. Then, the sheet was cut in a designed size to obtain a paste type nickel positive electrode having a capacity of 700 mAh.

Separately, to 100 parts of a hydrogen absorbing alloy having the following composition, 2 parts of a nickel powder and 1 part of a $Co_3O_4$ powder were added, and further a suitable amount of an aqueous solution of carboxymethyl cellulose and a suitable amount of a polytetrafluoroethylene dispersion were added to obtain a negative electrode paste.

The composition of the hydrogen absorbing alloy was represented by the formula:

$$MmNi_{4.28}Co_{0.4}Mn_{0.37}Al_{0.3}Mg_{0.05}$$

in which Mm consists of 80 atomic % of La, 12 atomic % of Ce, 4 atomic % of Nd and 4 atomic % of Pr, and an atomic ratio of the total of Ni, Co, Mn and Al to Mm is 5.4.

The negative electrode paste was applied to a substrate consisting of a perforated iron-nickel-plated steel plate, dried and press molded in the form of a sheet. Then, the sheet was cut in a designed size to obtain a negative electrode.

The above obtained negative and positive electrodes were spirally wound with interposing a sulfonated polypropylene separator between them to assemble an electrode member.

The electrode member was inserted in a cell can, and a designed amount of an electrolytic solution consisting of a 30 wt. % aqueous solution of potassium hydroxide containing 45 g/L of dissolved zinc oxide was poured. Then, the opening of the can was sealed to obtain a nickel metal-hydride cell having the structure shown in FIG. 1.

The cell of FIG. 1 comprises the non-sintered paste type nickel positive electrode 1 containing nickel hydroxide as an active material, and the negative electrode 2 containing the hydrogen absorbing alloy as an active material. In FIG. 1, the substrates of the electrodes are not shown for simplicity.

The positive electrode 1 and the negative electrode 2 are spirally wound with interposing the separator 3 between them to form an electrode member 4 and inserted in the cell can 5, as described above. On the top of the electrode member 4, the insulator 14 is placed, while on the bottom of the cell can 4, the insulator 13 is placed prior to the insertion of the electrode member 4.

The cell of FIG. 1 has the annular gasket 6 made of polyamide (Nylon 66), and the cell lid 7 comprising the terminal plate 8, the sealing plate 9, the metal spring 10 and the valve member 11. The spring 10 and the valve member 11 are placed in a space formed by the terminal plate 8 and the sealing plate 9. Thus the opening of the cell can 5 is sealed with the gasket 6 and the cell lid 7. That is, the electrode member 4, the insulators 13, 14, etc. are inserted In the cell can 5, an annular groove 5a, which protrudes inward, is formed near the opening of the cell can 5, the annular casket 6 and the cell lid 7 are placed in the opening of the cell can 5 while supporting the lower side of the annular gasket 6 with the protruded part formed by the groove 5a, and then the upper part of the cell can 5 above the groove 5a is inwardly constricted to seal the opening of the cell can 5.

The terminal plate 8 has a gas-outlet hole 8a, while the sealing plate 9 has a gas-detection hole 9a. Between the terminal plate 8 and the sealing plate 9, the metal spring 10 and the valve member 11 are placed. The peripheral part of the sealing plate 9 is inwardly bent to hold the periphery of the terminal plate 8 to fix them together.

In the nickel metal-hydride cell of FIG. 1, the valve member 11 closes the gas-detection hole 9a by the pressure of the metal spring 10, and thus the interior of the cell is maintained in the sealed state. If a gas is generated in the cell and the pressure in the cell abnormally increases, the metal spring 10 is compressed so that a gap is formed between the valve member 11 and the gas-detection hole 9a. Then, the gas in the cell escapes from the cell through the gas-detection hole 9a and the gas-outlet hole 8a. When the pressure in the cell decreases to a normal pressure, the metal spring 10 returns to the original state to press the valve member 11 so that the valve member 11 closes the gas-detection hole 9a, and the closed structure of the cell is maintained.

The cell of FIG. 1 has the lead member 12 for the positive electrode. The lead member 12 is made of a nickel ribbon. One end of the lead member 12 is spot welded to the exposed part of the metal porous substrate in the outermost turn of the positive electrode, while the other end of the lead member 12 is spot welded to the lower side of the sealing plate 9.

The terminal plate 8 is in contact with the sealing plate 9, and functions as the terminal of the positive electrode.

The perforated iron-nickel-plated steel plate substrate is exposed on the outer surface of the outermost turn of the negative electrode 2, and the exposed substrate is in contact with the inner wall of the cell can 5. Thereby, the cell can 5 can function as the terminal of the negative electrode.

The above-produced nickel metal-hydride cell was stored at 40° C. for 6 hours, and cooled to 25° C. Then, the cell was charged at 0.14 A for 7 hours and discharged at 0.14 A (final voltage: 1.0 V). The charging and discharging were repeated 5 times. After that, a quantity of electricity necessary for reducing cobalt oxide in the positive electrode to cobalt (II) oxide (C—Co(II)), and a quantity of electricity of a discharge reserve formed in the negative electrode (C—H) were measured by the following methods. The ratio of C—H to C—Co(II) was 1.1.

Measurement of C—Co(II) and C—H

After discharging the cell at 0.07 A to 0.7 V, the cell is disassembled, and the positive electrode and the negative electrode are recovered. Then, a quantity of electricity necessary for reducing cobalt oxide in the positive electrode to cobalt(II) oxide (C—Co(II)), and a quantity of electricity of a discharge reserve formed in the negative electrode (C—H) are measured as follows:

The recovered positive electrode and a cadmium electrode having a sufficient capacity in relation to the positive electrode, which has been charged, are combined, and dipped in an electrolytic solution having the same composition as that of the electrolytic solution used in the above assembling process of the cell to set up a cell. Then, the quantity of electricity is measured by discharging the cell at 0.000035 A to 0 V. The measured quantity of electricity is C—Co(II).

The recovered negative electrode is dipped in boiling pure water so that hydrogen, which is stored in the negative electrode as the discharge reserve, is desorbed as a hydrogen gas, and trapped by the water-replacing method. Then, the trapped hydrogen gas is cooled to 20° C., and its volume is measured. The mole of the hydrogen gas calculated from the volume is converted to a quantity of electricity, which is used as C—H.

In the Examples and Comparative Examples, the C—Co(II) and C—H value is an averaged value of the measured values with 10 cells.

EXAMPLE 2

A nickel metal-hydride cell was produced in the same manner as in Example 1 except that 1.2 parts of metal cobalt was used in place of 2.9 parts of cobalt monoxide as a cobalt conducting aid in the preparation of the positive electrode, and 1.6 parts of a $\beta$-Co(OH)$_2$ powder was used in place of 1 part of the Co$_3$O$_4$ powder in the preparation of the negative electrode.

The ratio of C—H to C—Co(II) was 1.3.

EXAMPLE 3

A nickel metal-hydride cell was produced in the same manner as in Example 2 except that a Yb$_2$O$_3$ powder was applied to the separator in an amount of 1.5 mg/cm$^2$.

The ratio of C—H to C—Co(II) was 1.2.

EXAMPLE 4

A nickel metal-hydride cell was produced in the same manner as in Example 3 except that, in the preparation of the positive electrode, the pressed sheet-form electrode was charged at 0.035 A in a 30 wt. % aqueous solution of potassium hydroxide for 4 hours instead of the alkali dipping treatment, washed with water and dried.

The ratio of C—H to C—Co(II) was 0.9.

Comparative Example 1

A nickel metal-hydride cell was produced in the same manner as in Example 1 except that nickel hydroxide which is not coated with cobalt was used and 2.2 parts of metal cobalt was used in place of 2.9 parts of cobalt monoxide as a cobalt conducting aid in the preparation of the positive electrode, and no Co$_3$O$_4$ powder was used in the preparation of the negative electrode.

The ratio of C—H to C—Co(II) was 2.4.

Comparative Example 2

A nickel metal-hydride cell was produced in the same manner as in Example 1 except that the pressed sheet-form electrode was not subjected to the alkali-dipping treatment in the preparation of the positive electrode, and the amount of the Co$_3$O$_4$ powder was changed to 0.6 part in the preparation of the negative electrode.

The ratio of C—H to C—Co(II) was 1.6.

The nickel metal-hydride cell produced in each of Examples and Comparative Examples was stored at 80° C. for 14 days, and the change of the voltage was monitored.

Figure 2:
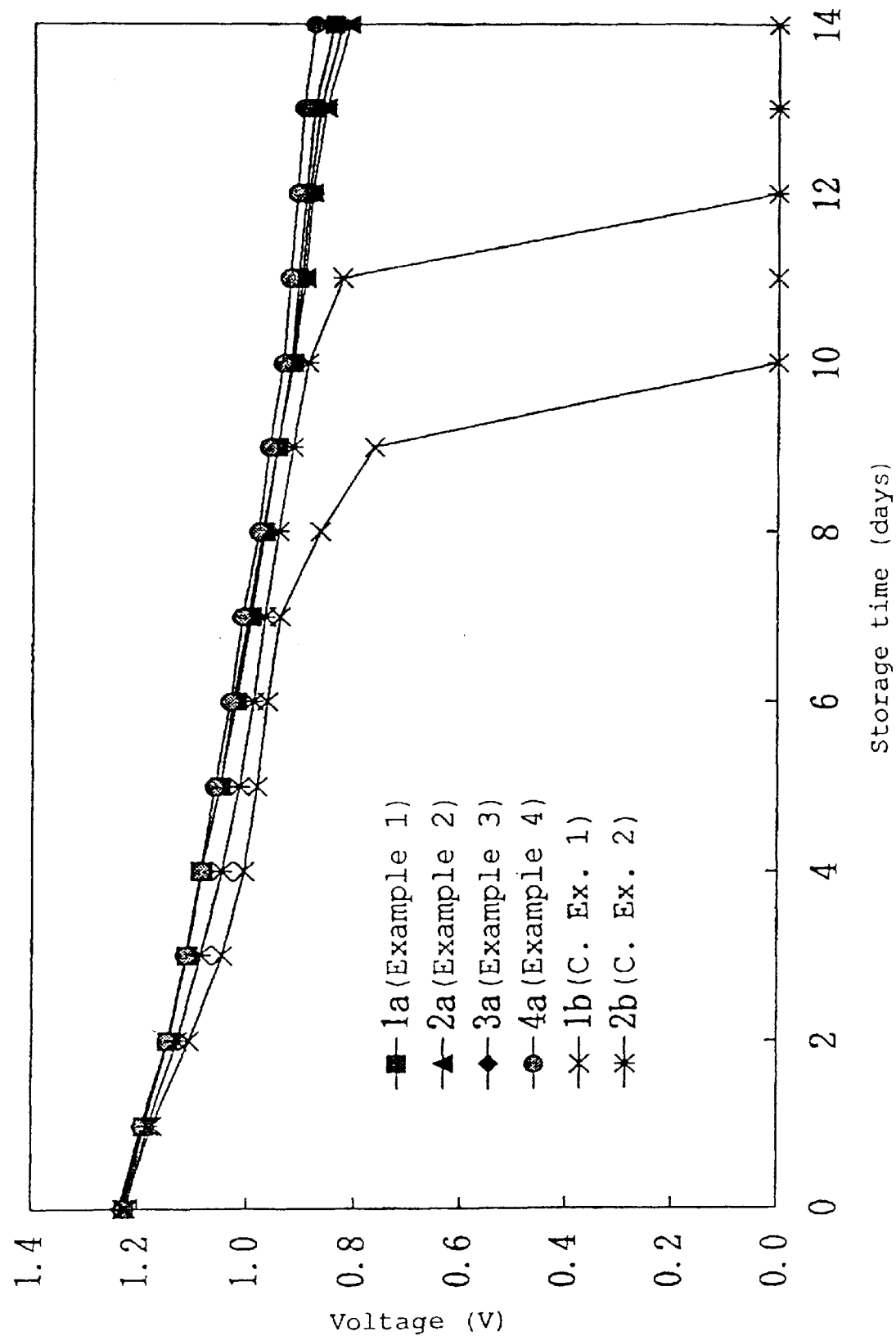
FIG. 2 is a graph showing the change of voltage when the cells of Examples 1–4 and Comparative Examples 1–2 were stored in a high temperature atmosphere.

The results are shown in FIG. 2.

With the nickel metal-hydride cell produced in each of Examples 1–4 and Comparative Examples 1–2, the initial discharge capacity (before storage) and the discharge capacity after storage in a high temperature atmosphere (80° C., 14 days) were measured. The percentage of the discharge capacity after storage in a high temperature atmosphere based on the initial discharge capacity was calculated and evaluated as a capacity recovery rate after the storage in the high temperature atmosphere. The results are shown in Table 1.

For reference, the C—H/C—Co(II) ratios are also listed in Table 1.

TABLE 1

|  | C—H/C—Co (II) | capacity recovery rate (%) |
|---|---|---|
| Example 1 | 1.1 | 99.1 |
| Example 2 | 1.3 | 98.5 |
| Example 3 | 1.2 | 98.9 |
| Example 4 | 0.9 | 100.0 |
| C. Ex. 1 | 2.4 | 69.3 |
| C. Ex. 2 | 1.6 | 81.6 |

As can be understood from the results in Table 1 and FIG. 2, the nickel metal-hydride cells of the present invention (Examples 1–4) had the improved high temperature storage properties, that is, they suffered from less decrease of the voltage during the storage in the high temperature atmosphere, and the discharge capacity after the storage in the high temperature atmosphere was substantially the same as the initial discharge capacity, although a non-stoichiometric misch metal alloy containing Mn was used as a hydrogen absorbing alloy contained in the negative electrodes.

In contrast, the nickel metal-hydride cells of Comparative Examples 1–2 suffered from the large decrease of the voltage during the storage in the high temperature atmosphere and had the low capacity recovery rate after the storage in the high temperature atmosphere, since cobalt oxide in the positive electrode was reduced.

What is claimed is:

1. A nickel metal-hydride cell comprising:

a paste type nickel positive electrode containing nickel hydroxide and a cobalt conducting aid selected from the group consisting of metal cobalt and cobalt compounds, a negative electrode which comprises a hydrogen absorbing alloy having a composition of the formula:

$$MmNi_{5-x+y}M_x$$

wherein Mm is a rare earth element containing at least La, M is a metal element containing at least Mn, x is a number larger than 0 and smaller than 2, and y is a number larger than −0.2 and smaller than 0.6, a separator interposed between the positive and the negative electrodes, and an electrolytic solution comprising an aqueous alkaline solution, in which a ratio of C—H to C—Co(II) is 1.3 or less, wherein C—H is a quantity of electricity of a discharge reserve formed in the negative electrode, and C—Co(II) is a quantity of electricity necessary for reducing cobalt oxide with a higher oxidation state in the positive electrode to cobalt(II) oxide.

2. The nickel metal-hydride cell according to claim 1, wherein said separator contains at least one species selected from the group consisting of yttrium species, ytterbium species and erbium species.

3. The nickel metal-hydride cell according to claim 1, wherein said nickel hydroxide in said positive electrode contains 0.5 to 5.0% by weight of cobalt in a solid solution form.

4. The nickel metal-hydride cell according to claim 1, wherein said nickel hydroxide in said positive electrode contains 0.5 to 5.0% by weight of zinc in a solid solution form.

* * * * *